(12) United States Patent
Cavataio et al.

(10) Patent No.: US 9,068,491 B2
(45) Date of Patent: Jun. 30, 2015

(54) SCR CATALYST DIAGNOSTICS

(71) Applicant: Ford Global Technologies, LLC, Dearborn, MI (US)

(72) Inventors: Giovanni Cavataio, Dearborn, MI (US); Jeffrey Allen Doering, Canton, MI (US); Thomas G. Leone, Ypsilanti, MI (US); Joseph Robert Theis, Wayne, MI (US); Michael James Uhrich, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 13/686,529

(22) Filed: Nov. 27, 2012

(65) Prior Publication Data
US 2014/0144125 A1    May 29, 2014

(51) Int. Cl.
| | |
|---|---|
| *F01N 3/18* | (2006.01) |
| *F01N 3/10* | (2006.01) |
| *F01N 3/20* | (2006.01) |
| *F01N 11/00* | (2006.01) |
| *F01N 13/00* | (2010.01) |
| *F02D 41/02* | (2006.01) |
| *F02D 41/14* | (2006.01) |
| *F01N 3/035* | (2006.01) |
| *F02D 41/22* | (2006.01) |

(52) U.S. Cl.
CPC .............. *F01N 3/101* (2013.01); *F01N 3/2066* (2013.01); *F01N 11/007* (2013.01); *F01N 3/035* (2013.01); *F01N 2550/02* (2013.01); *F01N 2560/025* (2013.01); *F01N 2560/14* (2013.01); *F01N 2900/0422* (2013.01); *F01N 13/009* (2014.06); *Y02T 10/47* (2013.01); *Y02T 10/22* (2013.01); *F02D 41/0275* (2013.01); *F02D 41/1441* (2013.01); *F02D 41/1454* (2013.01); *F02D 41/1456* (2013.01); *F02D 41/22* (2013.01); *F02D 2041/1468* (2013.01); *Y02T 10/24* (2013.01)

(58) Field of Classification Search
USPC .................................... 60/274, 277, 286, 295
See application file for complete search history.

(56) References Cited

U.S. PATENT DOCUMENTS

| | | | |
|---|---|---|---|
| 5,159,810 A   | 11/1992 | Grutter et al. | |
| 5,228,286 A * | 7/1993  | Demura .......................... | 60/276 |
| 5,280,707 A * | 1/1994  | Nakashima et al. ............ | 60/276 |
| 5,740,676 A * | 4/1998  | Agustin et al. ................. | 60/276 |
| 6,112,518 A   | 9/2000  | Jerger et al. | |

(Continued)

*Primary Examiner* — Kenneth Bomberg
*Assistant Examiner* — Brandon Lee
(74) *Attorney, Agent, or Firm* — Julia Voutyras; Alleman Hall McCoy Russell & Tuttle LLP

(57) ABSTRACT

In one embodiment, a method for an engine comprises operating the engine with an upstream exhaust sensor, intermediate exhaust sensor, and downstream exhaust sensor each indicating rich, adjusting engine operation to operate the engine with an upstream exhaust sensor, intermediate exhaust sensor, and downstream exhaust sensor each indicating lean, adjusting engine operation to operate the engine with the upstream exhaust sensor indicating rich and the intermediate and downstream exhaust sensors each indicating lean, and indicating degradation of an SCR catalyst based on when the intermediate and downstream exhaust sensors switch from lean to rich.

19 Claims, 3 Drawing Sheets

(56) References Cited

U.S. PATENT DOCUMENTS

| | | |
|---|---|---|
| 6,253,547 B1 * | 7/2001 | Watanabe et al. ............... 60/297 |
| 6,904,751 B2 | 6/2005 | Makki et al. |
| 7,640,730 B2 * | 1/2010 | Gandhi et al. ................. 60/297 |
| 2001/0022082 A1 * | 9/2001 | Oguma et al. ................. 60/285 |
| 2009/0056315 A1 * | 3/2009 | Solbrig et al. ................. 60/286 |
| 2010/0005873 A1 | 1/2010 | Katoh et al. |
| 2010/0057328 A1 * | 3/2010 | Brown et al. ................. 701/103 |
| 2011/0152068 A1 * | 6/2011 | Keshavan et al. ............ 502/159 |

* cited by examiner

SCR CATALYST DIAGNOSTICS

FIELD

The present disclosure relates to an internal combustion engine.

BACKGROUND AND SUMMARY

In order to reduce the release of exhaust emissions to atmosphere, vehicles may be equipped with various exhaust aftertreatment devices. For example, three-way catalysts may reduce levels of various emissions including carbon monoxide and unburnt hydrocarbons while selective catalyst reduction systems may be used to reduce levels of NOx. To ensure the aftertreatment devices are functioning optimally, various sensors may be installed upstream and/or downstream of the devices, and feedback from the sensors may be used to determine if emissions are slipping past the devices.

In order to determine if NOx is slipping past a catalyst, a NOx sensor placed downstream of the catalyst may be monitored, and if the sensor detects NOx in the exhaust, operating parameters may be adjusted to reduce NOx emissions in the exhaust and/or a vehicle operator may be notified that the catalyst is degraded. However, particularly when used in gasoline engines, NOx sensors may not be sensitive enough to detect the lower levels of NOx produced by the engine. Additionally, NOx sensors may be expensive, thus limiting the extent of their usage.

The inventors have recognized the issues with the above approach and offer a method to at least partly address them. In one embodiment, a method for an engine comprises operating the engine with an upstream exhaust sensor, intermediate exhaust sensor, and downstream exhaust sensor each indicating rich, adjusting engine operation to operate the engine with an upstream exhaust sensor, intermediate exhaust sensor, and downstream exhaust sensor each indicating lean, adjusting engine operation to operate the engine with the upstream exhaust sensor indicating rich and the intermediate and downstream exhaust sensors each indicating lean, and indicating degradation of an SCR catalyst based on when the intermediate and downstream exhaust sensors to switch from lean to rich.

In this way, an exhaust oxygen sensor such as a HEGO may be used to diagnose an SCR catalyst. The engine may be operated to store oxygen in the three-way catalyst, and then during a thermal event ammonia is released from the SCR catalyst. Upon a return to slightly rich operation, the stored oxygen in the TWC may react with the reductants in the exhaust from the engine to prevent the intermediate sensor, located upstream of the SCR catalyst, from sensing any reductants. The downstream sensor, located downstream of the SCR catalyst, thereby senses only the $NH_3$ released from the SCR catalyst. Based on a timing of when the downstream sensor switches from lean to rich (which indicates the amount of ammonia released from the SCR catalyst), degradation of the SCR catalyst may be indicated. Alternatively, if the difference in time for the intermediate and downstream sensors to switch from lean to rich falls below a threshold, degradation of the SCR catalyst may be indicated.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
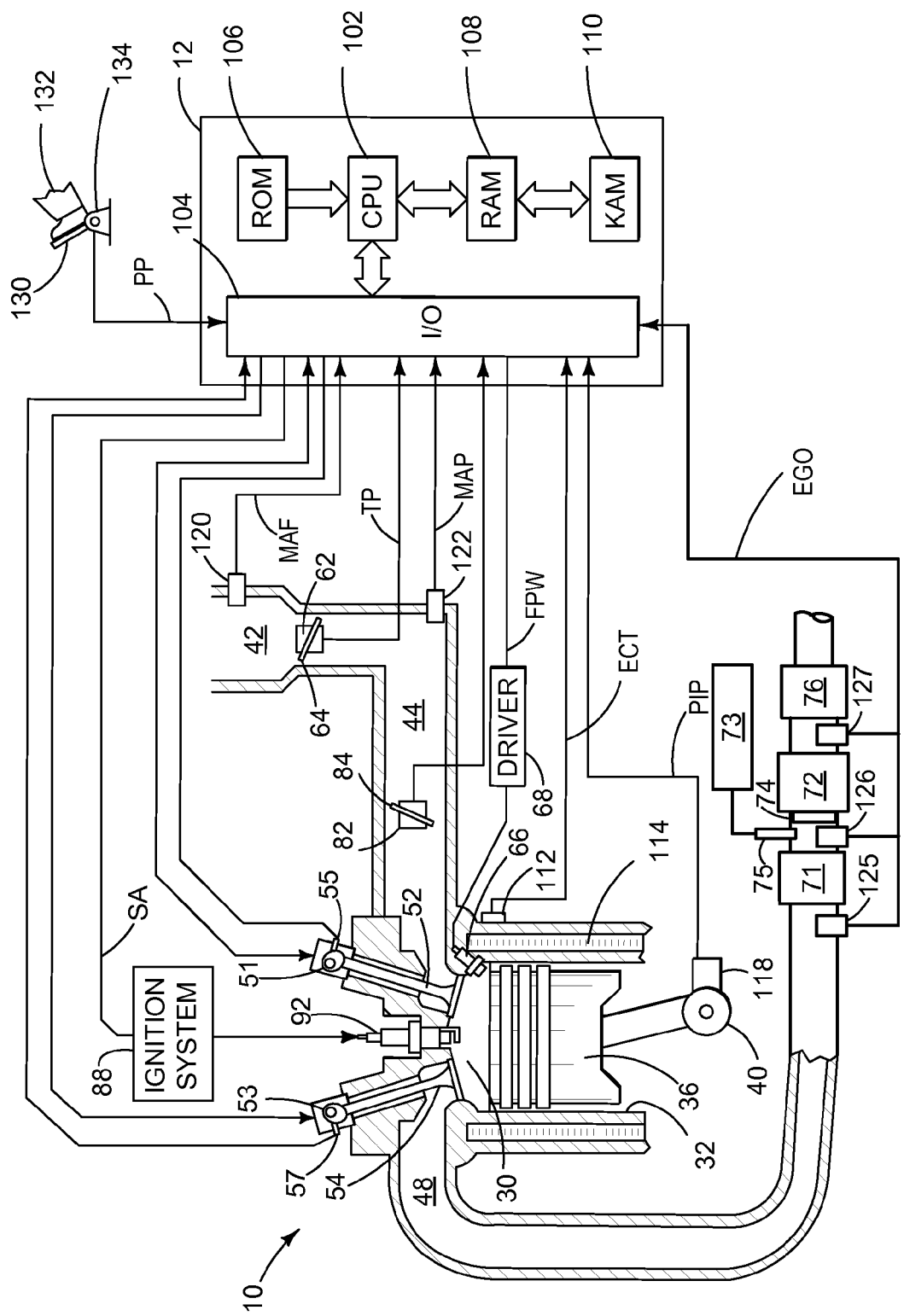
FIG. 1 shows a schematic diagram of an engine.

In order to diagnose degradation of a selective catalytic reduction (SCR) catalyst, release of ammonia from the SCR catalyst by exhaust oxygen sensors located upstream and downstream of the SCR catalyst may be monitored. Specifically, oxygen sensors such as heated exhaust gas oxygen (HEGO) sensors, have a sharp transition in voltage when the gas composition changes between rich and lean states. These sensors will switch from lean to rich with any combination of reductants, such as hydrocarbons (HC), carbon monoxide (CO), hydrogen ($H_2$), and ammonia ($NH_3$). Using the oxygen storage capacity function of a three-way catalyst upstream of the SCR catalyst, conditions where no HC, CO, and $H_2$ are present at the SCR catalyst (and upstream HEGO) may be created. Then, $NH_3$ stored in the SCR catalyst may be thermally released to the downstream sensor. Thus, the downstream sensor may be exposed to $NH_3$ but no other reductants during these conditions. The timing of when the downstream sensor switches from lean to rich as a result of the $NH_3$ release may indicate whether the catalyst is degraded and/or provide an estimate of the $NH_3$ storage capacity of the catalyst. FIG. 1 shows an engine diagram including an SCR catalyst, upstream three-way catalyst, and exhaust sensors. FIG. 1 also includes a controller which includes instructions to carry out the method illustrated in FIG. 2. FIG. 3 depicts example output of the exhaust sensors during the execution of the method of FIG. 2.

Referring now to FIG. 1, it includes a schematic diagram showing one cylinder of a multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a charge motion control valve (CMCV) 84 and a CMCV plate 82 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Emission control devices 71, 72, and 76 are shown arranged along exhaust passage 48. In the depicted embodiment, device 71 may be a three-way catalyst (TWC), device 72 may be a selective catalytic reduction (SCR) catalyst, while device 76 may be a diesel oxidation catalyst (DOC), diesel particulate filter (DPF), $NO_x$ trap, various other emission control devices, or combinations thereof. Alternative arrangements are also possible in some embodiments, such as only device 71 and device 72 being arranged in the exhaust passage. For the SCR catalyst (e.g., device 72), reductant (e.g., $NH_3$) may be produced via the upstream TWC. However, in some embodiments, a reductant tank 73 may be present to store reductant, such as urea or $NH_3$. The tank 73 may be coupled to an injector 75 to inject reductant into the exhaust upstream of the device 72 or into the device 72 in order to reduce NOx in the device 71. Further, a mixer 74 may be provided to ensure adequate mixing of the reductant within the exhaust stream. Ammonia may be injected in proportion to an amount of engine feedgas NOx entering the SCR.

Exhaust gas sensors are shown coupled to exhaust passage 48. Sensors 125, 126 and 127 each may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Sensor 125 may be an upstream sensor provided upstream of emission control devices 71, 72, and 76, while sensor 126 be an intermediate sensor provided downstream of emission control device 71 and upstream of emission control device 72. Sensor 127 may be a downstream sensor provided downstream of emission control device 72.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

Thus, the system described above provides for a system comprising an engine coupled to an exhaust passage; a three-way catalyst arranged in the exhaust passage; an SCR catalyst arranged in the exhaust passage downstream of the three-way catalyst; an upstream exhaust sensor arranged upstream of the three-way catalyst, an intermediate exhaust sensor arranged downstream of the three-way catalyst, and a downstream exhaust sensor arranged downstream of the SCR catalyst; and a controller including instructions to: operate the engine with the upstream, intermediate, and downstream exhaust sensors each indicating lean; adjust engine operation to operate the engine with the upstream exhaust sensor reading rich and the intermediate and downstream exhaust sensors each indicating lean; and indicate degradation of the SCR catalyst based on when the downstream exhaust sensor to switches from lean to rich.

The controller may include instructions to cease fuel injection to the engine in order to operate with the upstream, intermediate, and downstream exhaust sensors each indicating lean. The controller may include instructions to adjust engine operation by resuming fuel injection and operating with rich combustion in order to operate the engine with the upstream exhaust sensor indicating rich and the intermediate and downstream exhaust sensors each indicating lean. The controller may include instructions to indicate degradation of the SCR catalyst if an amount of time from the adjustment of engine operation to when the downstream exhaust sensor switches from lean to rich is greater than a threshold. Alternatively, the controller may indicate degradation of the SCR catalyst if the difference in time for the intermediate and downstream sensors to switch from lean to rich is less than a threshold. The controller may include further instructions to determine a reductant storage capacity of the SCR catalyst based on when the downstream exhaust sensor switches from lean to rich.

Figure 2:
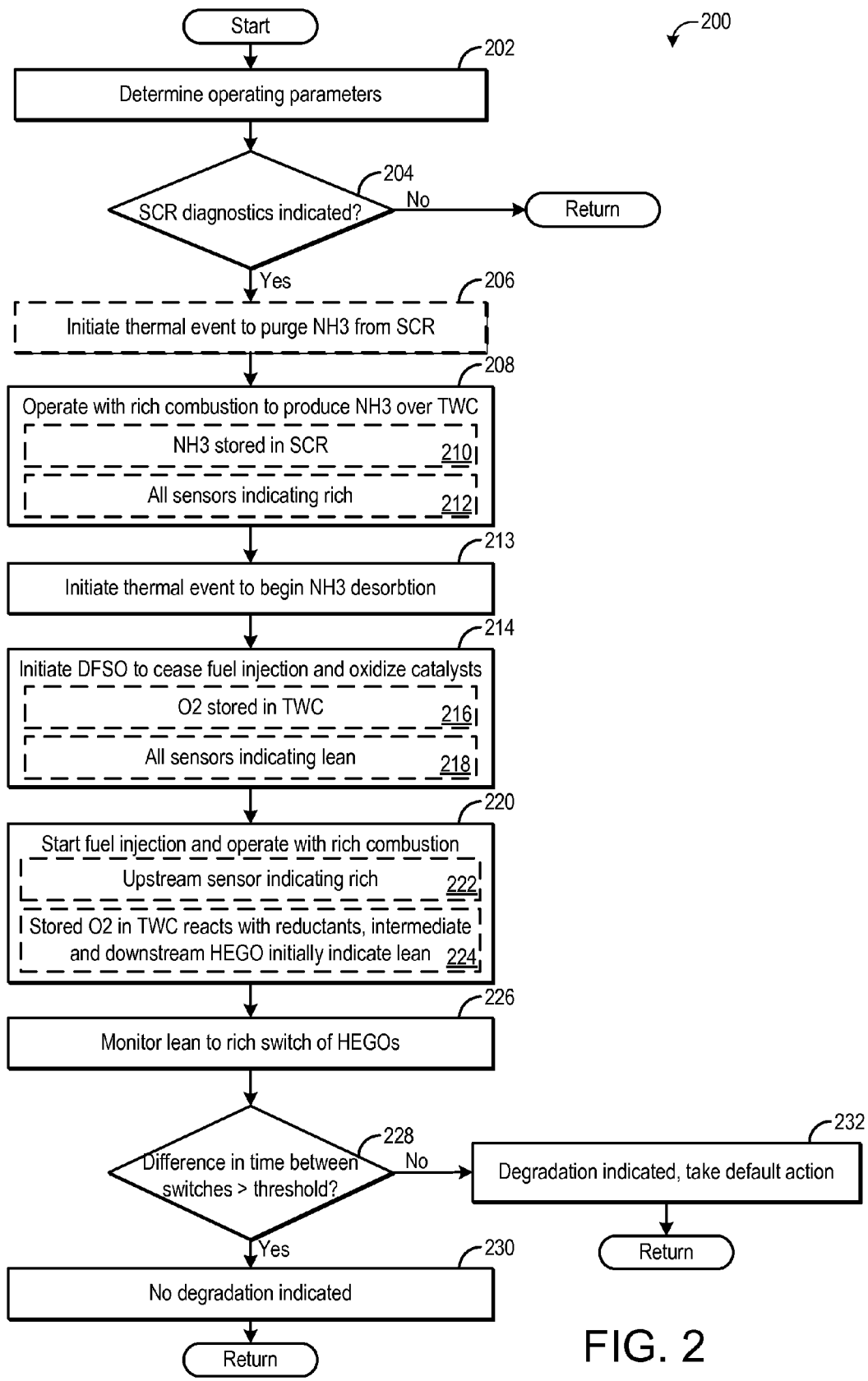
FIG. 2 shows an example method for diagnosing an SCR catalyst.
Figure 3:
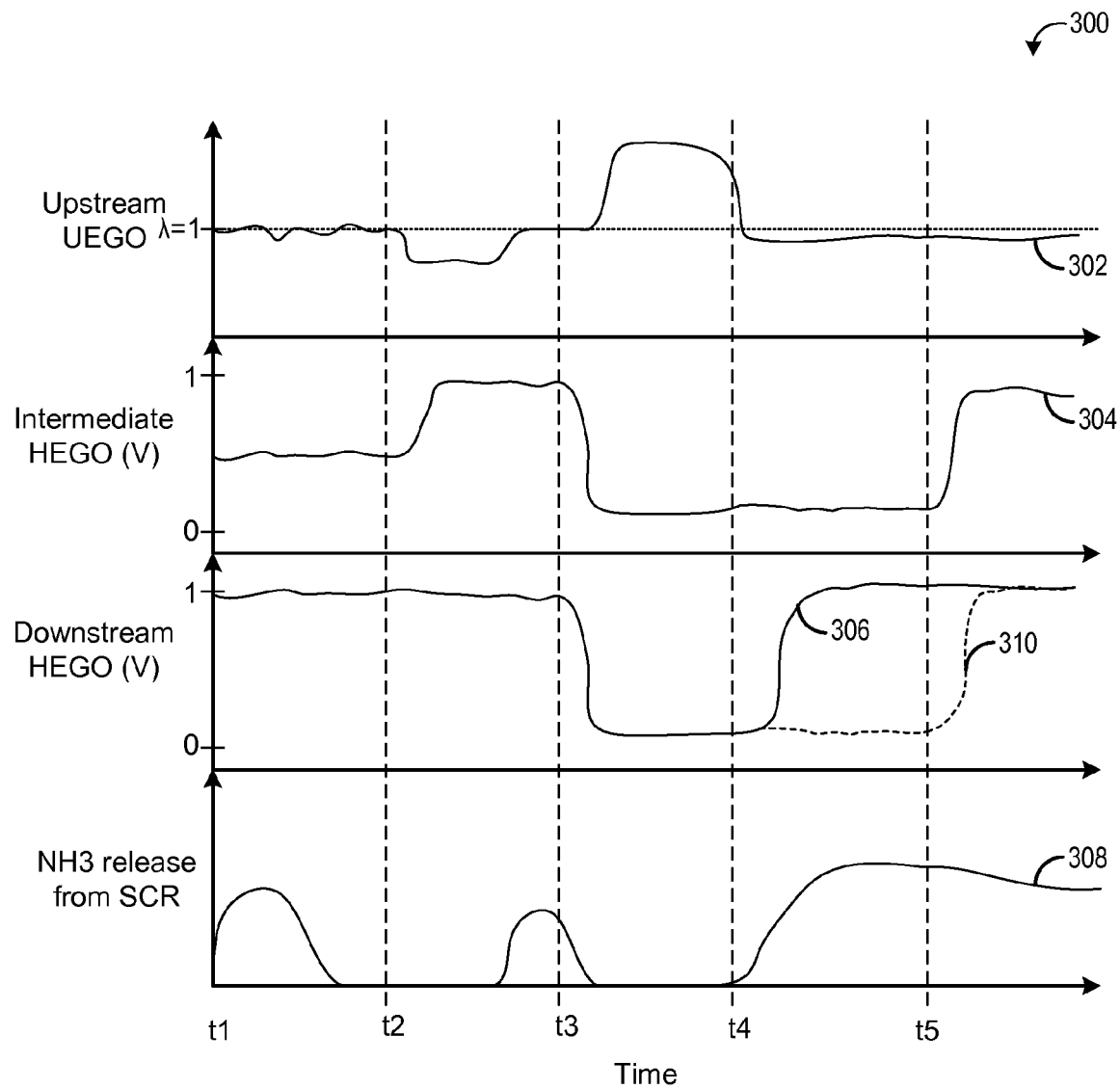
FIG. 3 shows example sensor readings during the execution of the method of FIG. 2.

Turning to FIG. 2, a method 200 for diagnosing an SCR catalyst is depicted. Method 200 may be carried by controller 12 according to instructions stored thereon in order to diagnose an SCR catalyst (such as device 72) based on feedback received from an upstream exhaust oxygen sensor, such as a UEGO (e.g., exhaust sensor 125), a first, intermediate HEGO (e.g., sensor 126), and a second, downstream HEGO (such as sensor 127). The upstream UEGO may be located upstream of a three-way catalyst (TWC), the intermediate HEGO may be located downstream of the TWC but upstream of the SCR catalyst, and the downstream HEGO may be located downstream of the SCR catalyst.

At 202, method 200 includes determining engine operating parameters. The operating parameters may include engine speed and load, engine temperature, time since a previous SCR diagnostic routine was performed, catalyst efficiency (as determined based on output from the exhaust sensors, for example), etc. At 204, it is determined if it is an appropriate time to perform an SCR diagnostic routine. The SCR diagnostic routine may be indicated if a threshold amount of time has elapsed since a previous routine was performed. Additionally or alternatively, the SCR diagnostic routine may be carried out if certain operating conditions are met, such as engine or catalyst temperature being below a threshold (as the routine may increase engine and/or exhaust temperature). If the SCR diagnostic routine is not indicated, method 200 returns.

If the routine is indicated, method 200 proceeds to 206 to optionally initiate a thermal event to purge $NH_3$ from the SCR catalyst. Prior to determining if $NH_3$ is released from the SCR catalyst at a designated rate and/or determining the storage of the SCR catalyst, the SCR catalyst may be initially emptied of all stored $NH_3$. In doing so, when the SCR catalyst is subsequently filled with $NH_3$, excess $NH_3$ will not be inadvertently released to atmosphere. The thermal event may include vehicle acceleration carried out with stoichiometric air-fuel ratio, which may act to raise the temperature of the exhaust and hence the SCR catalyst, in turn causing $NH_3$ to be released from the SCR catalyst. However, in some embodiments, the SCR diagnostic may be initiated without an initial purge of the $NH_3$ from the SCR.

At 208, the engine is operated with rich combustion, which produces $NH_3$ in a three-way catalyst (TWC) upstream of the SCR catalyst. As indicated at 210, the $NH_3$ produced by the TWC is carried downstream to the SCR catalyst, where it may be stored. The engine may be operated with rich combustion until the SCR catalyst reaches saturation. As a result of the rich combustion, all three sensors in the exhaust system may be indicating rich, as indicated at 212.

At 213, another thermal event is initiated to heat up the SCR catalyst to cause the $NH_3$ to start desorbing from the SCR catalyst. Similar to the thermal event described above, this thermal event may be caused by a stoichiometric vehicle acceleration. At 214, the catalysts may be oxidized, by operating with lean combustion or by supplying secondary air to the TWC. In one example, lean combustion may be provided by ceasing fuel injection to the engine, for example by initiating a deceleration fuel shut-off (DFSO) event. During DFSO, fuel injection to the engine may be stopped while intake air is still pumped through the cylinders. Thus, the exhaust reaching the catalysts may be lean. Other mechanisms for providing oxygen to the TWC are also possible. As a result of the extra oxygen in the exhaust during the DFSO operation, oxygen may be stored in the TWC, as indicated at 216. Additionally, as indicated at 218, the UEGO and HEGOs may each be indicating lean. Further, the non-combusted air may be cooler than combusted air, thus lowering the temperature of the catalysts.

Upon oxidization of the TWC and SCR catalyst, method 200 proceeds to 220 to commence fuel injection and operate with rich combustion. The rich combustion may be just rich of stoichiometry, such as a lambda of 0.990 to 0.999. The richer the air-fuel ratio, the faster the breakthrough of reductants through the TWC will be, and thus the faster the switch of the intermediate HEGO. Thus, by maintaining only a slightly rich air-fuel ratio, the period of time for monitoring the lean to rich switch of the HEGOs, described below, will be maximized, thus increasing the accuracy and reliability of the diagnostic. As indicated at 222, the upstream UEGO indicates rich due to the rich combustion. However, the intermediate and downstream HEGOs each continue to indicate lean for at least a short duration following the start of rich combustion, as indicated at 224. The stored oxygen in the TWC reacts with reductants in the exhaust, thus preventing the release of any reductants to the SCR catalyst. As a result, the intermediate HEGO continues to indicate lean until the stored oxygen has been used and reductants break through the TWC to the sensor. Due to the lack of reductants in the exhaust, the downstream HEGO also indicates lean, until the $NH_3$ release from the SCR catalyst caused by the temperature increase during the acceleration reaches a sufficient concentration to cause the downstream HEGO to switch rich.

Due to the previous acceleration event, which causes the $NH_3$ to start desorbing, the temperature of the SCR will only decrease during the DFSO and the return to slightly rich operation. Thus, following the DFSO, the $NH_3$ will still be released from the SCR, given that it takes a duration of time for the $NH_3$ to release as the heat moves through the SCR catalyst. It is in this time that the DFSO and return to slightly rich operation may be performed, and then the $NH_3$ release from the SCR catalyst may be monitored.

At 226, the lean to rich switch of the HEGOs is monitored. As described above, the upstream UEGO may remain rich as long as the engine operates with rich combustion. The downstream HEGO may switch from lean to rich once a threshold amount of $NH_3$ is released from the SCR catalyst. The intermediate HEGO may switch from lean to rich once the reductants breakthrough the TWC. The amount of time for the reductants to break through the TWC may be longer than the amount of time it takes for the $NH_3$ to be released from the SCR catalyst, which may occur relatively rapidly in a non-degraded catalyst. Thus, the time for the switch from lean to rich of the downstream HEGO may be compared to the time for the switch from lean to rich of the intermediate HEGO, and if the difference is smaller than expected, degradation may be indicated.

At 228, it is determined if the amount of time between when the intermediate and downstream HEGOs switched is greater than a threshold. The threshold time may be based on an expected time determined from previous operations, for example, a fresh catalyst may be monitored and the time difference between when the intermediate HEGO switches and when the downstream HEGO switches may be stored.

If the time between switches is greater than the threshold, method 200 proceeds to 232 to indicate no degradation, as the SCR catalyst is storing an acceptable amount of $NH_3$. If the time between switches is not greater than the threshold time, method 200 proceeds to 230 to indicate SCR catalyst degradation and take default action. Thus, if it takes longer than expected for the downstream HEGO to switch from lean to rich (and hence a smaller amount of time between when the intermediate HEGO switches from lean to rich and when the downstream HEGO switches from lean to rich), less $NH_3$ may be stored in the SCR catalyst than expected. This may indicate degradation of the catalyst, or may indicate a reduced $NH_3$ storage capacity. The default action may include notifying a vehicle operator (by lighting a malfunction indicator lamp for example), setting a diagnostic code, and/or adjusting engine operating parameters (such as increasing the rate of exhaust gas recirculation to reduce the NOx levels in the exhaust). Method 200 then returns.

While the method described above monitors the time between switches of the HEGOs, the time for the downstream HEGO to switch from lean to rich may be monitored and compared against an expected threshold time gathered from previous engine operations. If the downstream HEGO switches after a threshold time has elapsed since the start of rich combustion, degradation may be indicated. Further, by monitoring both the HEGO downstream of the SCR and the HEGO downstream of the TWC, possible degradation of the TWC may be indicated if the intermediate HEGO (downstream of the TWC) switches sooner than expected.

The amount of time for the intermediate and downstream sensors to switch from lean to rich may depend on the exhaust flow rate, level of richness of the air-fuel ratio following the DFSO operation, and the oxygen storage capacity of the TWC, which may change as the TWC ages. To normalize the switch times of the HEGOs for these variables, the difference between the switch times for the intermediate and downstream HEGOs may be divided by the amount of time it takes for the intermediate HEGO to switch from lean to rich.

FIG. 3 shows a diagram 300 illustrating example readings of the three exhaust sensors during execution of the method of FIG. 2 as well as $NH_3$ release from the SCR as a function of time. The reading of the upstream UEGO is illustrated by curve 302, the reading of the first, intermediate HEGO is illustrated by curve 304, reading of the second, downstream HEGO is illustrated by curve 306, and the $NH_3$ release from the SCR is illustrated by curve 308. For the UEGO reading, a stoichiometric reading is indicated by the dashed horizontal line, with a rich reading depicted in the diagram below stoichiometry and a lean reading above stoichiometry. The HEGO readings are the voltage output by the sensors, with higher voltage indicating a rich reading (e.g., 0.8 V) and lower voltage indicating a lean reading (e.g., 0.1 V).

Prior to time t1, the SCR diagnostic routine has not been initiated, and the engine operates with stoichiometric air-fuel ratio. Additionally, little or no $NH_3$ is released from the SCR catalyst. At time t1, the diagnostic routine is initiated, and the SCR catalyst is heated to release $NH_3$. As shown by curve 308, $NH_3$ release from the SCR increases, and as shown by curve 306, the downstream HEGO indicates rich as a result of the released $NH_3$. While the upstream UEGO and intermediate HEGO are depicted as indicating around stoichiometric, they may also indicate rich if the thermal event initiated to release the $NH_3$ includes a decrease in air-fuel ratio. After the $NH_3$ has been released from the SCR, the engine is operated with rich combustion at time t2 in order to produce $NH_3$ in the TWC for storage in the SCR. Thus, as shown by curves 302, 304, and 306, each of the sensors indicates rich. Once the SCR has reached saturation, a thermal event is initiated to start the release of $NH_3$ from the SCR, just prior to time t3. DFSO is initiated at t3 or the fuel injection to the engine is otherwise ceased. The resultant lean air causes the UEGO and each HEGO sensor to switch to lean. The oxygen in the exhaust oxidizes the catalysts, resulting in oxygen storage in the TWC and a temperature drop in the SCR. After a given time duration, the DFSO operation is terminated, and at time t4, fuel injection commences and the engine operates with slightly rich combustion. The upstream UEGO (curve 302) switches back to rich, reflecting the engine-out air-fuel ratio. However, both the intermediate and downstream HEGOs remain lean, due to the lack of reductants exiting the TWC.

Once the SCR reaches a high enough temperature, $NH_3$ will begin to be released from the SCR, as shown by curve 308. After a threshold amount of $NH_3$ is present in the exhaust, the downstream HEGO switches from lean to rich. In a non-degraded catalyst, this occurs relatively rapidly, and occurs before the intermediate HEGO switches from lean to rich, which is shown at time t5. Thus, in a non-degraded catalyst, the downstream HEGO switches from lean to rich prior to the intermediate HEGO, and a relatively long amount of time elapses between the switches. However, in a degraded catalyst, little or no $NH_3$ may be stored in the SCR, and thus the switch from lean to rich of the downstream HEGO may be delayed, as illustrated by dashed curve 310. However, even if the SCR catalyst is degraded, the lean to rich switch of the downstream HEGO will occur, due to the breakthrough of reductants from the intermediate HEGO. This switch may be slightly later than the switch of the intermediate HEGO due to the oxygen storage capacity of the SCR. In a degraded catalyst, the time between when the downstream HEGO switches and the intermediate HEGO switches may be smaller than in a non-degraded catalyst.

Thus, the methods and systems described herein provide for a method for an engine, comprising operating the engine with an upstream exhaust sensor, intermediate exhaust sensor, and downstream exhaust sensor each indicating lean; adjusting engine operation to operate the engine with the upstream exhaust sensor indicating rich and the intermediate and downstream exhaust sensors each indicating lean; and indicating degradation of an SCR catalyst based on when the intermediate and downstream exhaust sensors switch from lean to rich.

The upstream exhaust sensor may be located upstream of a three-way catalyst, the intermediate exhaust sensor may be located downstream of the three-way catalyst and upstream of the SCR catalyst, and the downstream exhaust sensor may be located downstream of the SCR catalyst. The adjusting engine operation to operate with the upstream exhaust sensor indicating rich and the intermediate and downstream exhaust sensors each indicating lean may occur immediately after the operating the engine with the upstream exhaust sensor, intermediate exhaust sensor, and downstream exhaust sensor each indicating lean.

Operating the engine with the upstream, intermediate, and downstream exhaust sensors each indicating lean may include operating the engine with fuel injection to the engine ceased, and adjusting engine operation may include commencing fuel injection and operating the engine with rich combustion. Following commencement of fuel injection with rich combustion, degradation of the SCR catalyst may be indicated if a difference between when the intermediate exhaust sensor switches from lean to rich and when the downstream exhaust sensor switches from lean to rich is less than a threshold.

The method may further comprise indicating no degradation if the difference between when the intermediate exhaust sensor switches from lean to rich and when the downstream exhaust sensor switches from lean to rich is greater than the threshold. The switch from lean to rich of the intermediate exhaust sensor may occur due to breakthrough of reductants from the three-way catalyst, and the switch from lean to rich of the downstream exhaust sensor may occur due to release of ammonia from the SCR catalyst.

In another example, a method comprises oxidizing an SCR catalyst and a three-way catalyst positioned upstream of the SCR catalyst by ceasing all engine fuel injection; after oxidizing the SCR and three-way catalysts, combusting a rich engine air-fuel ratio; and indicating SCR catalyst degradation based on a difference in time for a intermediate oxygen sensor downstream of the three-way catalyst and for a downstream oxygen sensor downstream of the SCR catalyst to switch from lean to rich.

The method may further comprise, prior to oxidizing the SCR and three-way catalysts, initiating a thermal event to cause $NH_3$ to be released from the SCR catalyst. The method may also further comprise prior to initiating the thermal event, producing reductant in the three-way catalyst by operating with rich combustion, the reductant stored in the SCR catalyst.

Degradation of the SCR catalyst may be indicated if a difference between when the downstream exhaust oxygen sensor switches from lean to rich and when the intermediate oxygen sensor switches from lean to rich is less than a threshold. The method may further comprise indicating no degradation the if the difference in time between when the intermediate exhaust oxygen sensor switches from lean to rich and when the downstream oxygen sensor switches from lean to rich is greater than the threshold.

The downstream oxygen sensor may switch from lean to rich when a threshold level of reductant is released from the SCR catalyst, and the intermediate oxygen sensor may switch from lean to rich when a threshold level of reductants are released from the three-way catalyst.

It will be appreciated that the configurations and methods disclosed herein are exemplary in nature, and that these specific embodiments are not to be considered in a limiting sense, because numerous variations are possible. For example, the above technology can be applied to V-6, V-8, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:

combusting air and fuel in the engine and passing exhaust gas having a rich air-fuel ratio from the engine to an upstream exhaust sensor, an intermediate exhaust sensor, and a downstream exhaust sensor each indicating a rich air-fuel ratio, the upstream exhaust sensor located upstream of a three-way catalyst; then releasing NH3 from an SCR catalyst located downstream of the three-way catalyst by initiating a thermal event; then adjusting combustion of the air and fuel in the engine and passing exhaust gas having a lean air-fuel ratio from the engine to the upstream exhaust sensor, the intermediate exhaust sensor, and the downstream exhaust sensor each indicating a lean air-fuel ratio; then adjusting combustion of air and fuel in the engine and passing exhaust gas having a rich air-fuel ratio from the engine to the upstream exhaust sensor indicating a rich air-fuel ratio and the intermediate and downstream exhaust sensors each indicating lean air-fuel ratios; and then indicating degradation of the SCR catalyst via a controller located downstream of the three way catalyst based on a timing of when the intermediate and downstream exhaust sensors switch from indicating a lean air-fuel ratio to a rich air-fuel ratio wherein the intermediate exhaust sensor is located downstream of the three-way catalyst and upstream of the SCR catalyst, and the downstream exhaust sensor is located downstream of the SCR catalyst.

2. The method of claim 1, wherein the adjusting combustion of air and fuel in the engine and passing exhaust gas having the rich air-fuel ratio from the engine to the upstream exhaust sensor indicating the rich air-fuel ratio and the intermediate and downstream exhaust sensors each indicating lean air-fuel ratios occurs immediately after combusting air and fuel in the engine and passing exhaust gas having the lean air-fuel ratio to the upstream exhaust sensor, the intermediate exhaust sensor, and the downstream exhaust sensor each indicating lean air-fuel ratios.

3. The method of claim 1, wherein combusting air and fuel in the engine and passing exhaust gas having the lean air-fuel ratio to the upstream, the intermediate, and the downstream exhaust sensors each indicating lean air-fuel ratios includes ceasing fuel injection to the engine.

4. The method of claim 2, wherein adjusting engine combustion of air and fuel includes commencing fuel injection and operating the engine with rich combustion.

5. The method of claim 4, wherein following commencement of fuel injection with rich combustion, indicating degradation of the SCR catalyst via the controller if a difference between when the intermediate exhaust sensor switches from indicating a lean air-fuel ratio to indicating a rich air-fuel ratio and when the downstream exhaust sensor switches from indicating a lean air-fuel ratio to indicating a rich air-fuel ratio is less than a threshold.

6. The method of claim 5, further comprising indicating no degradation if the difference between when the intermediate exhaust sensor switches from indicating the lean air-fuel ratio to indicating the rich air-fuel ratio and when the downstream exhaust sensor switches from a lean air-fuel ratio to a rich air-fuel ratio is greater than the threshold.

7. The method of claim 5, wherein the switch from indicating the lean air-fuel ratio to indicating the rich air-fuel ratio of the intermediate exhaust sensor occurs due to breakthrough of reductants from the three-way catalyst.

8. The method of claim 5, wherein the switch from indicating the lean air-fuel ratio to indicating the rich air-fuel ratio of the downstream exhaust sensor occurs due to release of ammonia from the SCR catalyst.

9. A method, comprising:
releasing NH3 from an SCR catalyst by initiating a thermal event; then
oxidizing the SCR catalyst and a three-way catalyst positioned upstream of the SCR catalyst by ceasing all engine fuel injection; then
after oxidizing the SCR and three-way catalysts, combusting a rich engine air-fuel ratio; and then
indicating SCR catalyst degradation via a controller based on a difference in time for an intermediate oxygen sensor downstream of the three-way catalyst and for a downstream oxygen sensor downstream of the SCR catalyst to switch from a lean air-fuel ratio to a rich air-fuel ratio.

10. The method of claim 9, further comprising prior to initiating the thermal event, producing reductant in the three-way catalyst by combusting a rich air-fuel ratio in the engine, the reductant stored in the SCR catalyst.

11. The method of claim 9, wherein degradation of the SCR catalyst is indicated via the controller if the difference in time between when the downstream exhaust oxygen sensor switches from indicating a lean air-fuel ratio to a rich air-fuel ratio and when the intermediate oxygen sensor switches from indicating a lean air-fuel ratio to a rich air-fuel ratio is less than a threshold.

12. The method of claim 10, further comprising indicating no degradation via the controller if the difference in time between when the downstream exhaust oxygen sensor switches from indicating a lean air-fuel ratio to indicating a rich air-fuel ratio and when the intermediate oxygen sensor switches from indicating a lean air-fuel ratio to indicating a rich air-fuel ratio is greater than the threshold.

13. The method of claim 9, wherein the downstream oxygen sensor switches from indicating a lean air-fuel ratio to indicating a rich air-fuel ratio when a threshold level of reductant is released from the SCR catalyst, and wherein the intermediate oxygen sensor switches from indicating a lean air-fuel ratio to indicating a rich air-fuel ratio when a threshold level of reductants are released from the three-way catalyst.

14. A system comprising:
an engine coupled to an exhaust passage; a three-way catalyst arranged in the exhaust passage;
an SCR catalyst arranged in the exhaust passage downstream of the three-way catalyst;
an upstream exhaust sensor arranged upstream of the three-way catalyst, an intermediate exhaust sensor arranged downstream of the three-way catalyst, and a downstream exhaust sensor arranged downstream of the SCR catalyst; and
a controller including instructions to
release NH3 from the SCR catalyst by initiating a thermal event; then
operate the engine with the upstream, intermediate, and downstream exhaust sensors each indicating a lean air-fuel ratio; then
adjust engine operation to operate the engine with the upstream exhaust sensor reading a rich air-fuel ratio and the intermediate and downstream exhaust sensors each indicating lean air-fuel ratios; and then
indicate degradation of the SCR catalyst based on when the intermediate and downstream exhaust sensors switch from a lean air-fuel ratio to a rich air-fuel ratio.

15. The system of claim 14, wherein the controller includes instructions to cease fuel injection to the engine in order to operate with the upstream, intermediate, and downstream exhaust sensors each indicating lean air-fuel ratios.

16. The system of claim 14, wherein the controller includes instructions to adjust engine operation by resuming fuel injection and operating with rich combustion in order to operate the engine with the upstream exhaust sensor indicating a rich air-fuel ratio and the intermediate and downstream exhaust sensors each indicating lean air-fuel ratios.

17. The system of claim 14, wherein the controller includes instructions to indicate degradation of the SCR catalyst if an amount of time from the adjustment of engine operation to when the downstream exhaust sensor switches from indicating a lean air-fuel ratio to indicating a rich air-fuel ratio is greater than a threshold.

18. The system of claim 14, wherein the controller includes further instructions to determine a reductant storage capacity of the SCR catalyst based on when the downstream exhaust sensor switches from a lean air-fuel ratio to a rich air-fuel ratio.

19. The method of claim 1, wherein the thermal event is a second thermal event, the method further comprising, prior to combusting air and fuel in the engine and passing exhaust gas having a rich air-fuel ratio from the engine to the upstream exhaust sensor, the intermediate exhaust sensor, and the downstream exhaust sensor each indicating rich air-fuel ratios, releasing all stored NH3 from the SCR catalyst by initiating a first thermal event.

* * * * *